US012344284B2

(12) United States Patent
Li et al.

(10) Patent No.: US 12,344,284 B2
(45) Date of Patent: Jul. 1, 2025

(54) TRANSFORMABLE ROBOT MECHANISM AND INSPECTION ROBOT

(71) Applicant: Guangdong Keystar Intelligence Robot Co., Ltd., Foshan (CN)

(72) Inventors: Fang Li, Foshan (CN); Shaochun Jia, Foshan (CN); Guangmian Fan, Foshan (CN); Jianyuan Li, Foshan (CN); Jiaju Xue, Foshan (CN); Jixian Wu, Foshan (CN)

(73) Assignee: Guangdong Keystar Intelligence Robot Co., Ltd., Foshan (CN)

( * ) Notice: Subject to any disclaimer, the term of this patent is extended or adjusted under 35 U.S.C. 154(b) by 909 days.

(21) Appl. No.: 17/432,126

(22) PCT Filed: Nov. 2, 2020

(86) PCT No.: PCT/CN2020/125899
§ 371 (c)(1),
(2) Date: Oct. 14, 2021

(87) PCT Pub. No.: WO2021/227387
PCT Pub. Date: Nov. 18, 2021

(65) Prior Publication Data
US 2022/0348236 A1 Nov. 3, 2022

(30) Foreign Application Priority Data
May 9, 2020 (CN) .......................... 202010387999.5

(51) Int. Cl.
*B61D 15/12* (2006.01)
*H02G 1/02* (2006.01)

(52) U.S. Cl.
CPC ............. *B61D 15/125* (2013.01); *H02G 1/02* (2013.01)

(58) Field of Classification Search
CPC ................................ H02G 1/02; B61D 15/125
See application file for complete search history.

(56) References Cited

U.S. PATENT DOCUMENTS

| | | | | |
|---|---|---|---|---|
| 5,901,651 | A * | 5/1999 | Boyd | H02G 1/04 104/112 |
| 9,371,960 | B2 * | 6/2016 | Lorimer | G01N 21/952 |
| 2011/0196536 | A1 * | 8/2011 | Phillips | H02G 1/02 901/44 |
| 2017/0012413 | A1 * | 1/2017 | Barbosa | H02G 1/02 |
| 2020/0358268 | A1 * | 11/2020 | Kuriloff | H02G 1/04 |

* cited by examiner

*Primary Examiner* — Robert J McCarry, Jr.
(74) *Attorney, Agent, or Firm* — Javalon Law, PC

(57) ABSTRACT

The embodiments provide a transformable robot mechanism and an inspection robot. The robot mechanism includes a functional device box, balance side shells, a battery cell, and a control panel. The balance side shells are rotatably installed on two sides of the functional device box respectively, wherein the balance side shells on one side of the functional device box are internally provided with the battery cell, and the balance side shells on the other side of the functional device box are internally provided with the control panel. The balance side shells are detachably connected to the functional device box. The inspection robot includes the robot mechanism, a robot movement assembly, and a vision assembly. The robot movement assembly is installed in the functional device box and is configured to drive the robot mechanism to move.

9 Claims, 3 Drawing Sheets

TRANSFORMABLE ROBOT MECHANISM AND INSPECTION ROBOT

TECHNICAL FIELD

The present disclosure relates to the field of inspection robot technologies, and more particularly, to a transformable robot mechanism and an inspection robot.

BACKGROUND

Inspection robots for overhead power transmission lines run on earth wires of high-voltage power transmission lines and can adapt to climatic environments in the wild. The robots may be equipped with a variety of detection devices to perform autonomous inspections on the overhead power transmission lines that span across large rivers, lofty mountains, and even virgin forests and depopulated zones. Consideration from functional layout is generally given to structures of existing inspection robots, which are large in volume and irregular in appearance, space-occupied in package, and inconvenient for transportation and storage.

SUMMARY

An objective of the present disclosure is to provide a transformable robot mechanism, wherein a battery cell and a control panel are installed in balance side shells at two sides of a functional device box respectively.

The present disclosure also provides an inspection robot, to which the transformable robot mechanism is applied.

For this purpose, the present disclosure adopts following technical solutions.

The transformable robot mechanism includes a functional device box, balance side shells, a battery cell, and a control panel.

The balance side shells are rotatably installed on two sides of the functional device box respectively, wherein the balance side shells on one side of the functional device box are internally provided with the battery cell, and the balance side shells on the other side of the functional device box are internally provided with the control panel. The balance side shells are detachably connected to the functional device box.

In some embodiments, the transformable robot mechanism also includes a shell connection assembly.

The balance side shell is connected to the functional device box through the shell connection assembly.

The shell connection assembly includes a shell connection plate.

The functional device box is provided with a shell installation groove, and the shell connection plate is installed in the shell installation groove.

The balance side shell is rotatably connected to the shell connection plate through a hinge.

In some embodiments, the shell connection assembly includes a shell fixation pin with an external thread structure.

The shell installation groove includes a shell insertion groove and a pin fixation groove.

The shell connection plate is provided with a horizontal clamp block and a vertical connection plate.

The horizontal clamp block is provided with a fixing through hole. The pin fixation groove is internally provided with a pin fixation hole with an internal thread structure. The vertical connection plate is vertically inserted into the shell insertion groove, such that the horizontal clamp block is clamped into the pin fixation groove. The shell fixation pin passes through the fixing through hole, and fits into the pin fixation hole through the thread structure, such that the horizontal clamp block is detachably fixed to the pin fixation groove.

In some embodiments, the functional device box is aslant provided with a limit ramp on a side of the balance side shell.

The robot mechanism has an unfolded state and an angle adjustment state.

When the robot mechanism is in the unfolded state, the balance side shells on two sides are respectively arranged obliquely downward, and a bottom of the balance side shell abuts against the limit ramp.

When the robot mechanism is in the angle adjustment state, the balance side shells on the two sides are arranged obliquely upward or vertically upward respectively, and the bottom of the balance side shell is separated from the limit ramp.

In some embodiments, the transformable robot mechanism also includes a connection joint.

The connection joint is installed in the balance side shell. An end of the connection joint in the balance side shell is connected to the battery cell or the control panel, and another end of the connection joint extends out of the balance side shell. The connection joint extends out of an end of the balance side shell and is configured to connect a functional device outside the balance side shell.

An inspection robot includes a robot mechanism, a robot movement assembly, and a vision assembly.

The robot mechanism is the robot mechanism previously mentioned. The robot movement assembly is installed in the functional device box and is configured to drive the robot mechanism to move.

The vision assembly is installed in the functional device box and has shooting and video recording functions.

In some embodiments, the robot movement assembly includes a vertical connection arm and a moving wheel assembly. The vertical connection arm is installed in the functional device box, and the moving wheel assembly is installed on the vertical connection arm.

The vision assembly includes an arm monitoring camera, wherein the arm monitoring camera is installed in the functional device box, and the arm monitoring camera is arranged aslant with a lens thereof facing toward the robot movement assembly.

The functional device box is provided with a visual installation groove, and the visual installation groove is internally provided with a visual installation ramp arranged obliquely. The arm monitoring camera is installed in the functional device box, with the lens thereof being located on the visual installation ramp. The arm monitoring camera is configured to shoot and record a video of the robot movement assembly.

In some embodiments, the moving wheel assembly includes an active actuator, an active rotating wheel, a vertical movable track, a vertical movable seat, a driven moving wheel, and a vertical actuator.

The active actuator is installed on the vertical connection arm, and an output terminal of the active actuator is connected to the active rotating wheel. The active actuator is configured to drive the active rotating wheel to rotate.

The vertical movable track is installed on the vertical connection arm. The vertical movable seat is vertically movably installed on the vertical movable track. The driven moving wheel is installed on the vertical movable seat. The vertical actuator is installed on the vertical connection arm, and an output terminal of the vertical actuator is connected to the vertical movable seat. The vertical actuator is configured to drive the vertical movable seat to move on the vertical movable track, such that the driven moving wheel gets close to or away from the active rotating wheel.

In some embodiments, the active rotating wheel includes a hub member, a wear-resistant member, and an electrically conductive material.

The hub member is provided with a wear-resistant recess. The wear-resistant member is installed in the wear-resistant recess and is configured to contact and move on a power substrate. The wear-resistant member is provided with an electrically conductive groove configured to house the electrically conductive material. An end of the electrically conductive material contacts the hub member, and another end of the electrically conductive material contacts the power substrate, such that the hub member is connected to the power substrate.

In some embodiments, the vision assembly includes an external monitoring camera.

The external monitoring camera is arranged at a bottom of the functional device box and is located below the balance side shell. A lens of the external monitoring camera rotatably faces toward a movement direction of the inspection robot.

The present disclosure has following beneficial effects.

This robot mechanism is applied to a robot and provides a base for the robot, such that the robot is provided with a quick-dismantling structure of the battery cell and the control panel, and a balance degree of the robot is improved. Furthermore, it is ensured that the robot obtains sufficient balance force in the process of movement, and maintenance of the battery cell and the control panel is facilitated.

Figure 1:
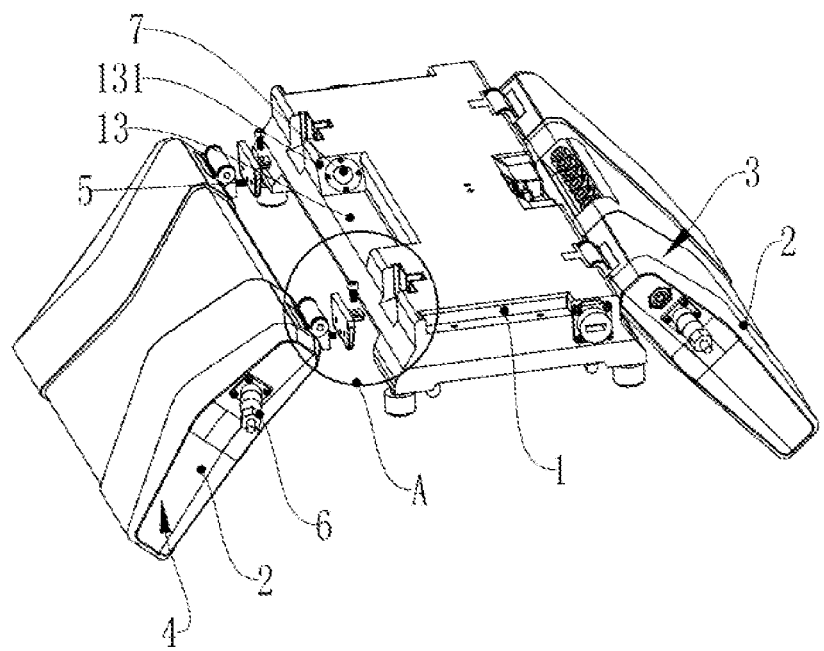
FIG. 1 is a schematic structural diagram of a robot mechanism in an unfolded state.
Figure 2:
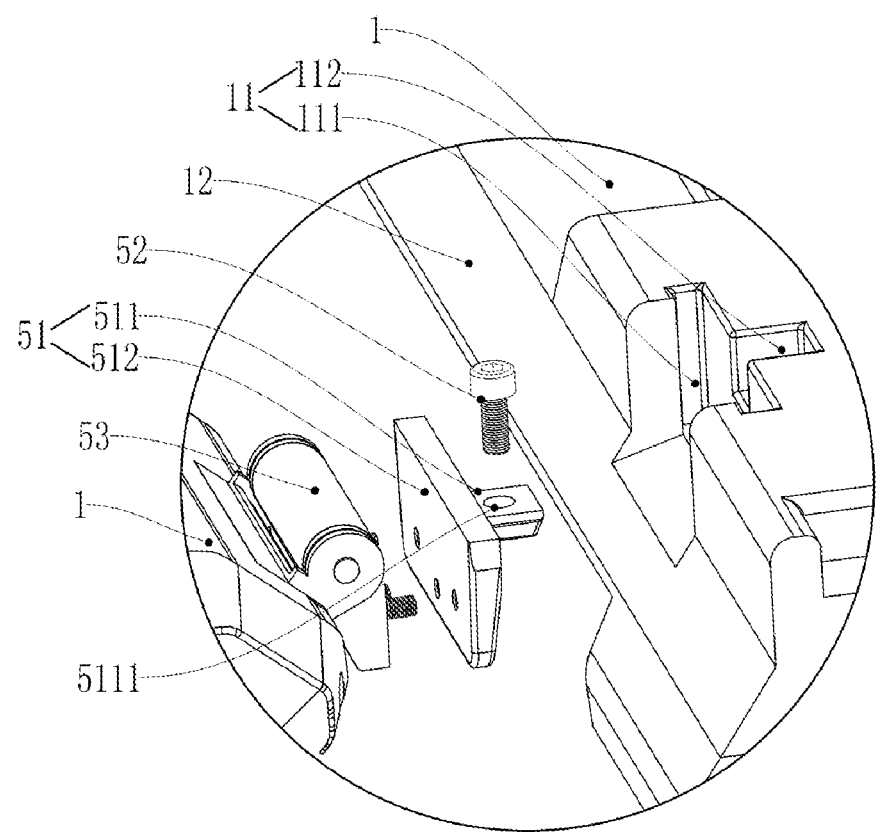
FIG. 2 is an enlarged view of Part A in FIG. 1.

robot mechanism 001, robot movement assembly 002, vision assembly 003;

functional device box 1, balance side shell 2, battery cell 3, control panel 4; shell connection assembly 5; connection joint 6; arm monitoring camera 7, external monitoring camera 9;

shell installation groove 11, limit ramp 12, visual installation groove 13; shell insertion groove 111, pin fixation groove 112; visual installation ramp 131;

shell connection plate 51; shell fixation pin 52;

horizontal clamp block 511, vertical connection plate 512; fixing through hole 5111;

vertical connection arm 61, active actuator 62 active rotating wheel 63, vertical movable track 64, vertical movable seat 65, driven moving wheel 66, vertical actuator 67; and hub member 81, wear-resistant member 82, electrically conductive material 83; wear-resistant recess 811; and electrically conductive groove 821.

DETAILED DESCRIPTION

The technical solutions of the present disclosure are described further below with reference to the accompanying drawings and embodiments.

A transformable robot mechanism includes a functional device box 1, balance side shells 2, a battery cell 3, and a control panel 4.

The balance side shells 2 are rotatably installed on two sides of the functional device box 1 respectively, wherein the balance side shells 2 on one side of the functional device box 1 are internally provided with the battery cell 3, and the balance side shells 2 on the other side of the functional device box 1 are internally provided with the control panel 4. The balance side shells 2 are detachably connected to the functional device box 1.

The function device box 1 is internally provided with an image transmission module configured to transmit pictures, videos and sounds to a terminal of an engineer, such that the engineer can receive information of the inspection robot.

This robot mechanism 001 is applied to a robot and provides a base for the robot, such that the robot is provided with a quick-dismantling structure of the battery cell 3 and the control panel 4, and a balance degree of the robot is improved. Furthermore, it is ensured that the robot obtains sufficient balance force in the process of movement, and maintenance of the battery cell 3 and the control panel 4 is facilitated.

In some embodiments, as a functional device for carrying a robot, the robot mechanism 001 may be, for example, a robot arm, a manipulator, and a robot moving structure, etc. In this solution, the control panel 4 and the battery cell 3 are detachably installed in the functional device box 1 through the balance side shells 2. In actual use, the battery cell 3 or the control panel 4 attached to the balance side shells 2 may be directly taken out, such that the battery cell 3 and the control panel 4 may be directly replaced on the spot. Furthermore, the balance side shells 2 are rotatable. Although locations of the battery cell 3 and the control panel 4 are adjusted, rotation of the battery cell 3 and the control panel 4 does not have a negative effect on power supply of the battery cell 3 or normal operation of the control panel 4 because the battery cell 3 and the control panel 4 are installed in a modular manner. The rotation of the balance side shells 2 makes it more convenient to carry the robot mechanism 001. Further, the battery cell 3 and the control panel 4 of the robot are generally heavier. The battery cell 3 and the control panel 4 are respectively arranged in the rotatable balance side shells 2, which can reduce a pressure of the functional device box 1, and the pressure of the balance side shells 2 is distributed on two sides of the functional device box 1. When the functional device box 1 moves, the balance side shells 2 on the two sides of the functional device box 1 disperse a force of the functional device box 1, making the functional device box 1 more balanced. In this way, it is ensured that a center of gravity of the robot remains unchanged during the movement, and thus movement stability of the robot is improved. The battery cell 3 is configured to supply power to components of the robot, and the control panel 4 is configured to control a working state of the robot.

For example, when the robot mechanism 001 is used in the inspection robot, the engineer generally needs to take the inspection robot up high. In this case, locations of the balance side shells 2 may be directly adjusted to adjust the balance side shells 2 of the inspection robot to the best locations, making it convenient for the engineer to take the inspection robot up high. After the inspection robot is taken up high, the engineer only needs to install the robot on the power substrate (such as earth wires or other cables), and adjust the balance side shells 2 to the location where the inspection robot keeps balance. In some embodiments, the balance side shells 2 of the robot mechanism 001 are equipped with the battery cell 3 or the control panel 4, and the balance side shells 2 are detachable. In the maintenance process, the engineer only needs to take the battery cell 3 or the control panel 4 up high. Therefore, the robot mechanism 001 has the advantage of easy disassembly in high-altitude environment.

In some embodiments, the transformable robot mechanism also includes a shell connection assembly 5. The balance side shell 2 is connected to the functional device box 1 through the shell connection assembly 5. The shell connection assembly 5 includes a shell connection plate 51.

The functional device box 1 is provided with a shell installation groove 11. The shell connection plate 51 is installed in the shell installation groove 11. The balance side shell 2 is rotatably connected to the shell connection plate 51 through a hinge 53.

The balance side shell 2 is rotatably connected to the shell connection plate 51 through the hinge, such that the balance side shell 2 is rotatably installed in the functional device box 1 to control the angle adjustment of the battery cell 3 and the control panel 4, which meets needs of the engineer for an operating state of the robot. The shell connection plate 51 is installed in the shell installation groove 11 through a snap-on connection mode, which reduces labor intensity for the engineer in the high-altitude environment, and the engineer does not need to spend a lot of time installing the balance side shells 2.

In some embodiments, the shell connection assembly 5 includes a shell fixation pin 52 with an external thread structure.

The shell installation groove 11 includes a shell insertion groove 111 and a pin fixation groove 112.

The shell connection plate 51 is provided with a horizontal clamp block 511 and a vertical connection plate 512.

The horizontal clamp block 511 is provided with a fixing through hole 5111. The pin fixation groove 112 is internally provided with a pin fixation hole with an internal thread structure. The vertical connection plate 512 is vertically inserted into the shell insertion groove 111, such that the horizontal clamp block 511 is clamped into the pin fixation groove 112. The shell fixation pin 52 passes through the fixing through hole 5111, and fits into the pin fixation hole through the thread structure, such that the horizontal clamp block 511 is detachably fixed to the pin fixation groove 112.

In some embodiments, the shell fixation pin 52 is a bolt. After the vertical connection plate 512 is vertically inserted into the shell insertion groove 111, the horizontal clamp block 511 enters the pin fixation groove 112, such that the shell connection plate 51 is respectively limited by the shell insertion groove 111 and the pin fixation groove 112. Furthermore, the shell fixation pin 52 passes through the fixing through hole 5111 of the horizontal clamp block 511, and then fits into the pin fixation hole of the pin fixation groove 112. In this shell connection assembly 5, the shell connection plate 51 is clamped into the shell insertion groove and the pin fixation groove 112, such that the shell connection plate 51 is limited in location. Further, after being fixed by the shell fixation pin 52, the shell connection plate 51 can provide sufficient support force to the balance side shells 2, and thus rotational stability of the balance side shells 2 is improved. A bolt head of the shell fixation pin 52 is outward, thus it is more convenient to adjust the fit between the shell fixation pin 52 and the pin fixation hole through a screwdriver.

In some embodiments, the functional device box 1 is aslant provided with a limit ramp 12 on a side of the balance side shell 2. The robot mechanism 001 has an unfolded state and an angle adjustment state.

When the robot mechanism 001 is in the unfolded state, the balance side shells 2 on two sides are respectively arranged obliquely downward, and a bottom of the balance side shell 2 abuts against the limit ramp 12. When the robot mechanism 001 is in the angle adjustment state, the balance side shells 2 on the two sides are arranged obliquely upward or vertically upward respectively, and the bottom of the balance side shell 2 is separated from the limit ramp 12.

The robot mechanism 001 has an unfolded state and an angle adjustment state. As shown in FIG. 1, the unfolded state is a state in which the inspection robot connected to the robot mechanism 001 needs to be installed on a cable to move. In this case, each of two sides of the functional device box 1 has the limit ramp 12, and the balance side shell 2 sticks to the limit ramp 12, such that the balance side shell 2 tilts downward to provide sufficient balance force for the inspection robot to ensure that the robot can move in a balanced manner.

Figure 3:
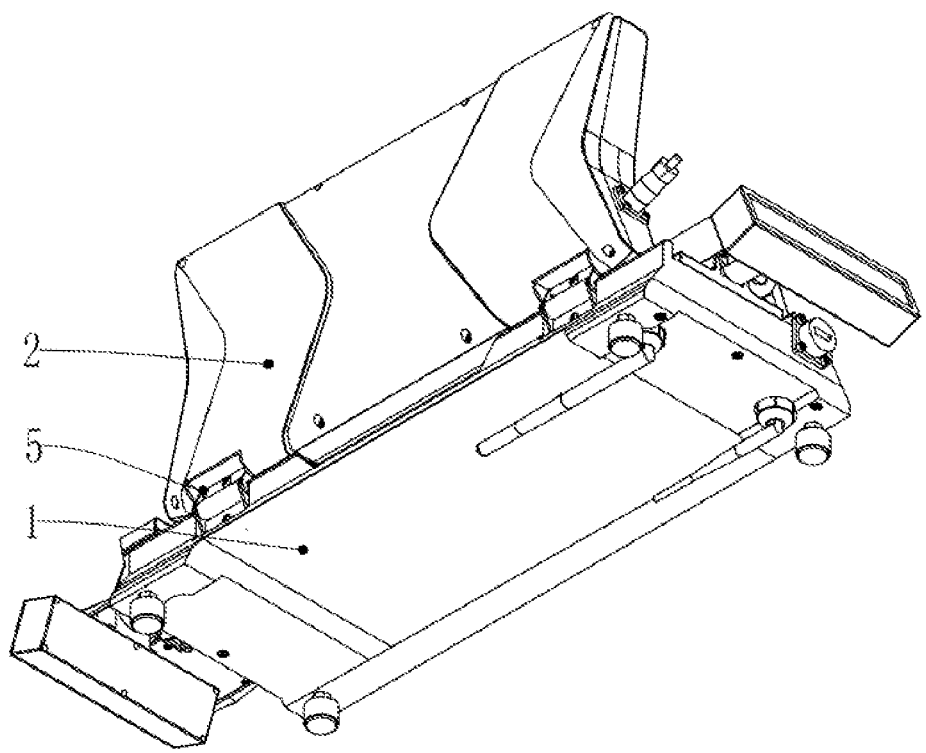
FIG. 3 is a schematic structural diagram of the robot mechanism in an angle adjustment state.
Figure 4:
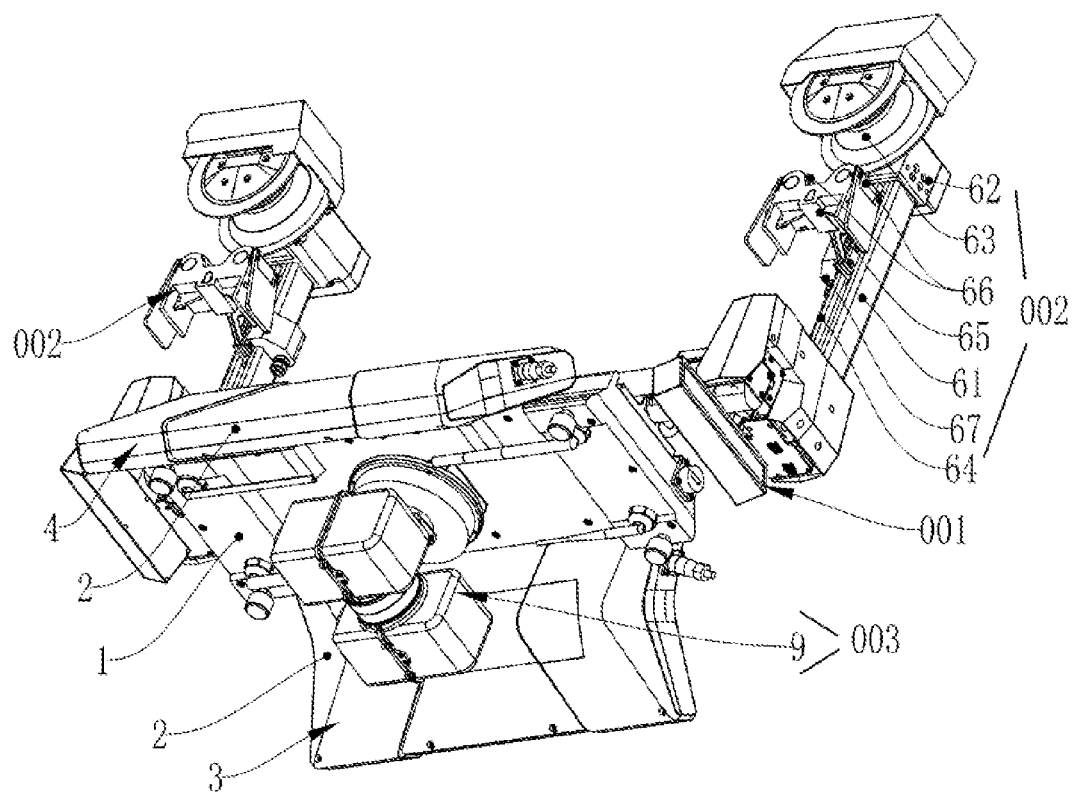
FIG. 4 is a schematic structural diagram of an inspection robot.
Figure 5:
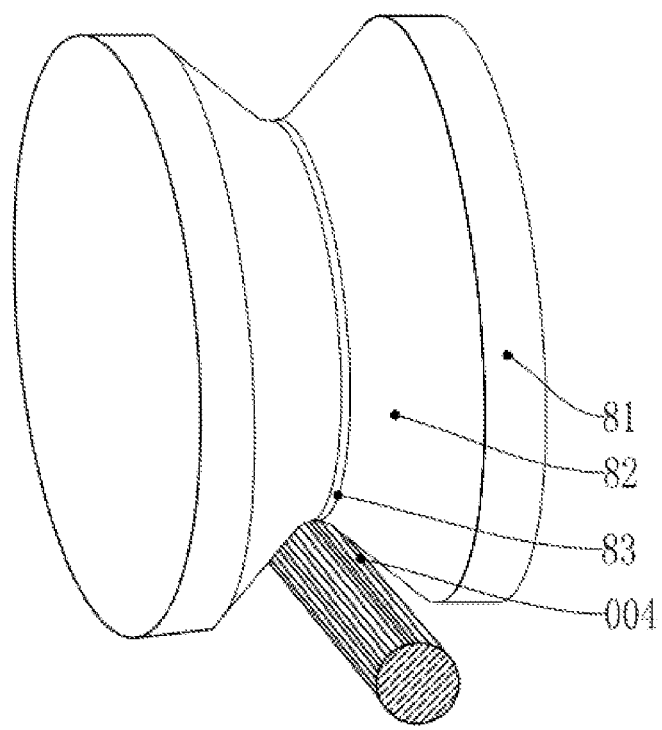
FIG. 5 is a schematic structural diagram of an active rotating wheel.
Figure 6:
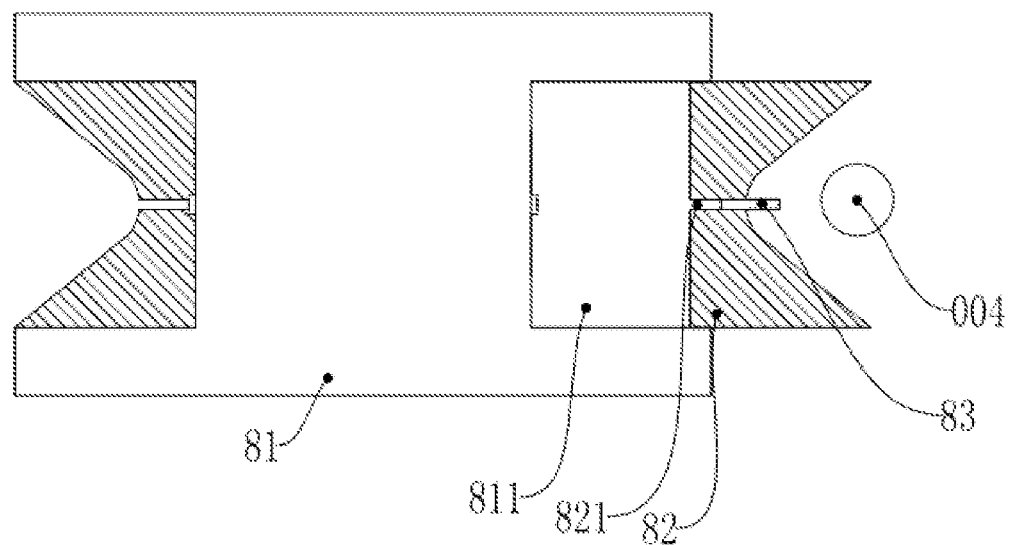
FIG. 6 is a schematic cross-sectional view of the active rotating wheel.

The angle adjustment state is a state where the engineer needs to adjust an inclination angle of the balance side shell 2, and in this state the bottom of the balance side shell 2 is separated from the limit ramp 12. As shown in FIG. 3, the balance side shell 2 may be adjusted to a vertical state at this moment, such that the balance side shell 2 may be folded toward inside of the robot as much as possible, and the balance side shell 2 is arranged obliquely upward or vertically upward, making it more convenient for the engineer to transfer the inspection robot.

In some embodiments, the transformable robot mechanism also includes a connection joint 6, which is installed in the balance side shell 2. An end of the connection joint 6 in the balance side shell 2 is connected to the battery cell 3 or the control panel 4, and another end of the connection joint 6 extends out of the balance side shell 2. The connection joint 6 extends out of an end of the balance side shell 2 and is configured to connect a functional device outside the balance side shell 2.

The balance side shell 2 is provided with the connection joint 6, which can connect an external device (such as the robot movement assembly 002, the vision assembly 003, and other functional devices commonly used in the inspection robot) to the battery cell 3 or the control panel 4. Furthermore, the connection joint 6 can facilitate the engineer to directly perform data download, data upload and data management operations on the control panel 4 and the battery cell 3 by means of the functional device. For example, a memory device is connected to the connection joint 6 of the control panel 4 to download data information of the inspection robot. The battery cell 3 and the control panel 4 may also be regarded as the functional device, and the connection joint 6 of the battery cell 3 is connected to the connection joint 6 of the control panel 4 by wires, to achieve the effect of supplying power to the control panel 4 using the battery cell 3.

An inspection robot includes a robot mechanism 001, a robot movement assembly 002, and a vision assembly 003. The robot mechanism 001 is the robot mechanism 001 previously mentioned. The robot movement assembly 002 is installed in the functional device box 1 and is configured to drive the robot mechanism 001 to move.

The vision assembly 003 is installed in the functional device box 1 and has shooting and video recording functions.

Generally, the inspection robot has the vision assembly 003 with shooting and video recording functions. While moving on a cable by means of the robot movement assembly 002, the inspection robot can obtain on-the-spot situations of the cable by means of the vision assembly 003 and feed back the on-the-spot situations of the cable to the engineer. In this solution, the battery cell 3 and the control panel 4 are respectively arranged on the balance side shells 2 on two sides. The balance side shells 2 on the two sides of the functional device box 1 can provide sufficient balance force to the inspection robot, and the battery cell 3 and the control panel 4 which are heavier may be arranged symmetrically, such that gravity of the inspection robot is located in its center as much as possible. In this way, it is solved the problem of unstable center of gravity during movement.

In some embodiments, the robot movement assembly 002 includes a vertical connection arm 61 and a moving wheel assembly. The vertical connection arm 61 is installed in the functional device box 1. The moving wheel assembly is installed on the vertical connection arm 61.

The vision assembly 003 includes an arm monitoring camera 7, wherein the arm monitoring camera 7 is installed in the functional device box 1, and the arm monitoring camera 7 is arranged aslant with a lens thereof facing toward the robot movement assembly 002.

The functional device box 1 is provided with a visual installation groove 13, and the visual installation groove 13 is internally provided with a visual installation ramp 131 arranged obliquely. The arm monitoring camera 7 is installed in the functional device box 1, with the lens thereof being located on the visual installation ramp 131. The arm monitoring camera 7 is configured to shoot and record a video of the robot movement assembly 002.

In this solution, the functional device box 1 is also provided with an arm monitoring camera 7. In this solution, the arm monitoring camera 7 is sealed in the functional device box 1. The lens of the arm monitoring camera 7 is partially tilted to shoot the robot movement assembly 002 to keep abreast of situations of the robot movement assembly 002. In this way, the arm monitoring camera 7 is maximally protected, the arm monitoring camera 7 is prevented from being exposed to outside environment, tightness of the arm monitoring camera 7 is improved, and no external space of the functional device box 1 is occupied.

In some embodiments, the moving wheel assembly includes an active actuator 62, an active rotating wheel 63, a vertical movable track 64, a vertical movable seat 65, a driven moving wheel 66, and a vertical actuator 67.

The active actuator 62 is installed on the vertical connection arm 61, an output terminal of the active actuator 62 is connected to the active rotating wheel 63, and the active actuator 62 is configured to drive the active rotating wheel 63 to rotate.

The vertical movable track 64 is installed on the vertical connection arm 61. The vertical movable seat 65 is vertically movably installed on the vertical movable track 64. The driven moving wheel 66 is installed on the vertical movable seat 65. The vertical actuator 67 is installed on the vertical connection arm 61, an output terminal of the vertical actuator 67 is connected to the vertical movable seat 65, and the vertical actuator 67 is configured to drive the vertical movable seat 65 to move on the vertical movable track 64, such that the driven moving wheel 66 gets close to or away from the active rotating wheel 63.

Driven by the vertical actuator 67, the vertical movable seat 65 can move on the vertical movable track 64, such that the driven moving wheel 66 gets close to or away from the active rotating wheel 63. Generally, a lower roller surface of the active rotating wheel 63 sticks to the cable, and an upper roller surface of the driven moving wheel 66 is driven to contact the cable or the lower roller surface of the active rotating wheel 63. The active actuator 62 drives the active rotating wheel 63 to rotate. Under the interaction of the active rotating wheel 63 and the driven moving wheel 66, the cable is clamped. Under a rotational action of the active rotating wheel 63, the inspection robot moves on the cable. The number of the moving wheel assemblies of the inspection robot is at least 2, and the moving wheel assemblies of the inspection robot are located at left and right ends of the functional device box 1, which further improves the balance of the inspection robot.

The active actuator 62 is a known rotary actuator, and In some embodiments is a motor. The vertical actuator 67 is a known vertical actuator, such as a cylinder, or a structure fitting a motor to a screw rod.

In some embodiments, the active rotating wheel 63 includes a hub member 81, a wear-resistant member 82, and an electrically conductive material 83. The hub member 81 is provided with a wear-resistant recess 811. The wear-resistant member 82 is installed in the wear-resistant recess 811 and is configured to contact and move on a power substrate 004. The wear-resistant member 82 is provided with an electrically conductive groove 821 configured to house the electrically conductive material 83. An end of the electrically conductive material 83 contacts the hub member 81, and another end of the electrically conductive material 83 contacts the power substrate 004, such that the hub member 81 is connected to the power substrate 004.

In this solution, the active rotating wheel 63 is installed on a power device. The active rotating wheel 63 can move on the power substrate 004 and roll on the power substrate 004 through the wear-resistant member 82, such that the electrically conductive material 83 connects the power substrate 004 to the hub member 81 to achieve conduction between the active rotating wheel 63 and the power substrate 004. Furthermore, under a balancing action of the balance side shells 2 on two sides of the inspection robot, the robot moves smoothly, and the electrically conductive material 83 can stably contact the power substrate 004.

In some embodiments, the active rotating wheel 63 moves on the power substrate 004, and the wear-resistant member 82 is in contact with the power substrate 004. By selecting a material with better performance as the wear-resistant member 82, after the wear-resistant member 82 contacts the power substrate 004, the electrically conductive material 83 connects the power substrate 004 outside to the hub member 81 inside. For example, when the power substrate 004 is an earth wire and the wear-resistant member 82 moves on a surface of the power substrate 004, the wear-resistant member 82 conducts the electrically conductive material 83 to the surface of the power substrate 004, and the electrically conductive material 83 connects the hub member 81 to the earth wire. In this way, safety in use of the power device may be improved. For example, static electricity can be transferred through the earth wire during the movement.

In some embodiments, the vision assembly 003 includes an external monitoring camera 9. The external monitoring camera 9 is arranged at a bottom of the functional device box 1 and is located below the balance side shell 2. A lens of the external monitoring camera 9 rotatably faces toward a movement direction of the inspection robot.

In this solution, the external monitoring camera 9 is arranged at the bottom of the functional device box 1. When the inspection robot is in the unfolded state, the balance side shells 2 on the two sides of the functional device box 1 can cover the external monitoring camera 9, and the balance side shells 2 are arranged obliquely, such that rainwater flowing through an upper surface of the balance side shell 2 can be guided to flow downward through an inclined surface of the balance side shell 2. That is, the external monitoring camera 9 is separated from the rainwater maximally. In this way, waterproofness of the external monitoring camera 9 is improved, and adverse effects of the rainwater on the external monitoring camera 9 are reduced. The external monitoring camera 9 can be configured to shoot situations of the cable, and can feed back the situations of the cable to the engineer in real time.

Technical principles of the present disclosure have been described above with reference to some embodiments. These descriptions are only for explaining the principles of the present disclosure, and cannot be construed as limiting the protection scope of the present disclosure in any way. Based on the explanation here, other embodiments of the present disclosure are conceivable to those skilled in the art without creative labor, and these embodiments will fall within the protection scope of the present disclosure.

What is claimed is:

1. A transformable robot mechanism, comprising a functional device box, balance side shells, a battery cell, and a control panel;
    the balance side shells being rotatably installed on two sides of the functional device box respectively, wherein one of the balance side shells on one side of the functional device box is internally provided with the battery cell, and another one of the balance side shells on other side of the functional device box is internally provided with the control panel; and the balance side shells being detachably connected to the functional device box;
    further comprising a shell connection assembly, wherein each of the balance side shells is connected to the functional device box through the shell connection assembly;
    wherein the shell connection assembly comprises a shell connection plate;
    wherein the functional device box is provided with a shell installation groove; the shell connection plate is installed in the shell installation groove; and
    each of the balance side shell is rotatably connected to the shell connection plate through a hinge.

2. The transformable robot mechanism according to claim 1, wherein the shell connection assembly comprises a shell fixation pin with an external thread structure;
    the shell installation groove comprises a shell insertion groove and a pin fixation groove;
    the shell connection plate is provided with a horizontal clamp block and a vertical connection plate; and
    the horizontal clamp block is provided with a fixing through hole; the pin fixation groove is internally provided with a pin fixation hole with an internal thread structure; the vertical connection plate is vertically inserted into the shell insertion groove, such that the horizontal clamp block is clamped into the pin fixation groove; the shell fixation pin passes through the fixing through hole, and fits into the pin fixation hole through the internal thread structure and the external thread structure, such that the horizontal clamp block is detachably fixed to the pin fixation groove.

3. The transformable robot mechanism according to claim 1, wherein the functional device box is aslant provided with a limit ramp on a side of one balance side shell; the transformable robot mechanism has an unfolded state and an angle adjustment state;
    when the transformable robot mechanism is in the unfolded state, the balance side shells on two sides are respectively arranged obliquely downward, and bottoms of the balance side shells abut against the limit ramp; and
    when the transformable robot mechanism is in the angle adjustment state, the balance side shells on the two sides are arranged obliquely upward or vertically upward respectively, and the bottom of the balance side shell is separated from the limit ramp.

4. The transformable robot mechanism according to claim 1, further comprising a connection joint, wherein
    the connection joint is installed in one balance side shell; a first end of the connection joint in the balance side shell is connected to the battery cell or the control panel, and a second end of the connection joint extends out of the balance side shell and is configured to connect a functional device outside the balance side shell.

5. An inspection robot, comprising: a transformable robot mechanism, a robot movement assembly, and a vision assembly;
    wherein the transformable robot mechanism comprises a functional device box, balance side shells, a battery cell, and a control panel, the balance side shells being rotatably installed on two sides of the functional device box respectively, wherein one of the balance side shells on one side of the functional device box is internally provided with the battery cell, and another one of the balance side shells on other side of the functional device box is internally provided with the control panel; and the balance side shells being detachably connected to the functional device box;
    wherein the transformable robot mechanism further comprises a shell connection assembly, wherein each of the balance side shells is connected to the functional device box through the shell connection assembly; wherein the shell connection assembly comprises a shell connection plate; wherein the functional device box is provided with a shell installation groove; the shell connection plate is installed in the shell installation groove; and each of the balance side shell is rotatably connected to the shell connection plate through a hinge;
    the robot movement assembly is installed in the functional device box and is configured to drive the transformable robot mechanism to move; and
    the vision assembly is installed in the functional device box and has shooting and video recording functions.

6. The inspection robot according to claim 5, wherein the robot movement assembly comprises a vertical connection arm and a moving wheel assembly; the vertical connection arm is installed in the functional device box; and the moving wheel assembly is installed on the vertical connection arm;
    the vision assembly comprises an arm monitoring camera; the arm monitoring camera is installed in the functional device box; the arm monitoring camera is arranged aslant with a lens thereof facing toward the robot movement assembly; and
    the functional device box is provided with a visual installation groove; the visual installation groove is internally provided with a visual installation ramp arranged obliquely; and the arm monitoring camera is installed in the functional device box, with the lens thereof being located on the visual installation ramp, the arm monitoring camera being configured to shoot and record a video of the robot movement assembly.

7. The inspection robot according to claim 6, wherein the moving wheel assembly comprises: an active actuator, an active rotating wheel, a vertical movable track, a vertical movable seat, a driven moving wheel, and a vertical actuator;

wherein the active actuator is installed on the vertical connection arm, an output terminal of the active actuator is connected to the active rotating wheel, and the active actuator is configured to drive the active rotating wheel to rotate; and wherein the vertical movable track is installed on the vertical connection arm; the vertical movable seat is vertically movably installed on the vertical movable track; the driven moving wheel is installed on the vertical movable seat; the vertical actuator is installed on the vertical connection arm, an output terminal of the vertical actuator is connected to the vertical movable seat, and the vertical actuator is configured to drive the vertical movable seat to move on the vertical movable track, such that the driven moving wheel gets close to or away from the active rotating wheel.

8. The inspection robot according to claim 7, wherein the active rotating wheel comprises a hub member, a wear-resistant member, and an electrically conductive material; and wherein the hub member is provided with a wear-resistant recess; the wear-resistant member is installed in the wear-resistant recess and is configured to contact and move on a power substrate; the wear-resistant member is provided with an electrically conductive groove configured to house the electrically conductive material; an end of the electrically conductive material contacts the hub member, and another end of the electrically conductive material contacts the power substrate, such that the hub member is connected to the power substrate.

9. The inspection robot according to claim 5, wherein the vision assembly comprises an external monitoring camera; and wherein the external monitoring camera is arranged at a bottom of the functional device box and is located below the balance side shells; and a lens of the external monitoring camera rotatably faces toward a movement direction of the inspection robot.

\* \* \* \* \*